F. A. WASSON.
TROLLEY BASE.
APPLICATION FILED OCT. 26, 1914.
1,187,117.
Patented June 13, 1916.
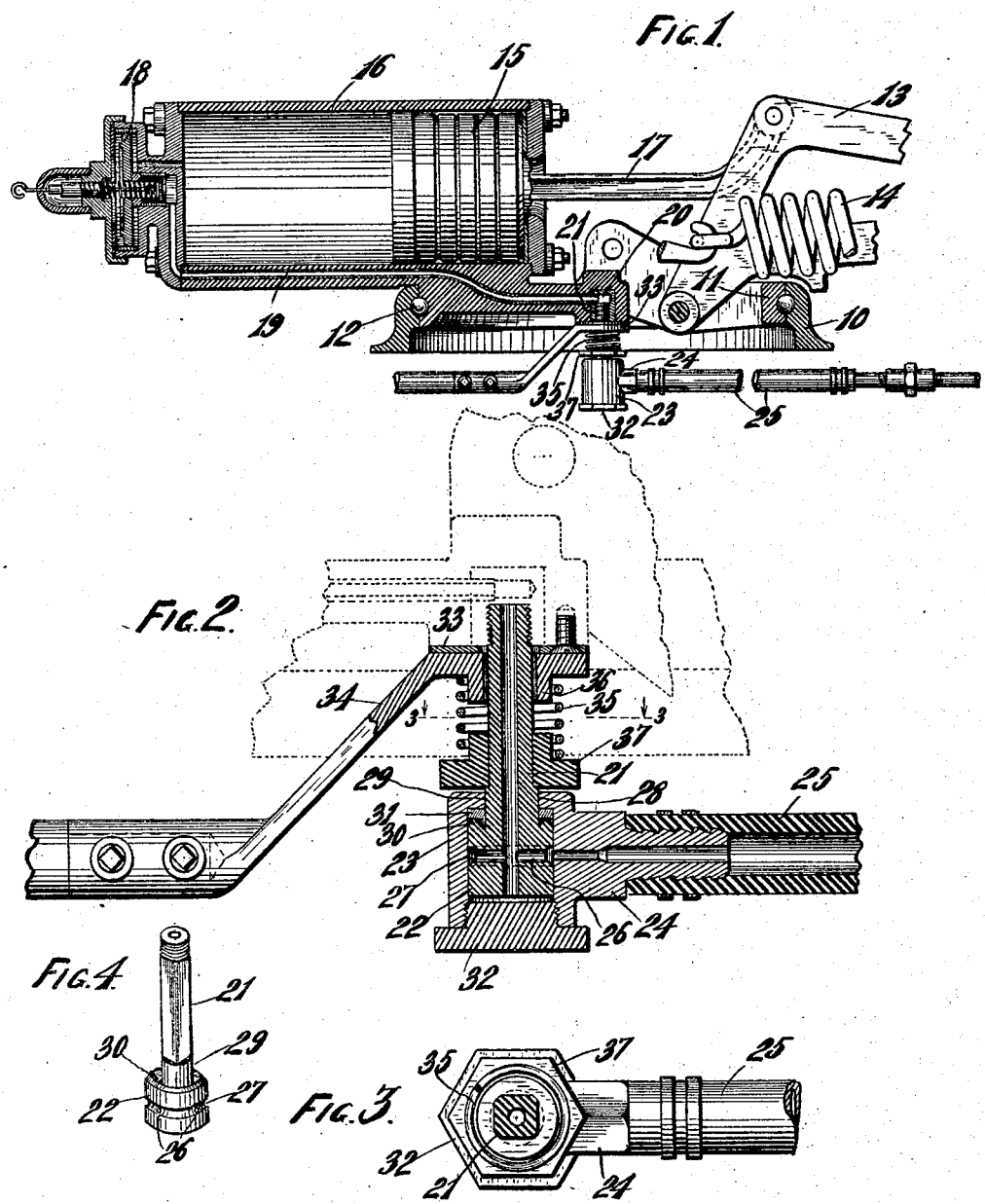

UNITED STATES PATENT OFFICE.

FRANK A. WASSON, OF MILWAUKEE, WISCONSIN, ASSIGNOR TO WASSON ENGINEERING AND SUPPLY COMPANY, OF SANTA ROSA, CALIFORNIA, A CORPORATION OF CALIFORNIA.

TROLLEY-BASE.

1,187,117.  Specification of Letters Patent.  Patented June 13, 1916.

Application filed October 26, 1914. Serial No. 868,578.

*To all whom it may concern:*

Be it known that I, FRANK A. WASSON, a citizen of the United States, and resident of Milwaukee, in the county of Milwaukee and State of Wisconsin, have invented new and useful Improvements in Trolley-Bases, of which the following is a description, reference being had to the accompanying drawings, which are a part of this specification.

This invention has for its object to provide a swivel joint for the trolley base of an air retrieved trolley and has for its objects to provide for conducting the compressed air through such swivel joint and to provide for maintaining electrical contact through the swivel joint and avoid reliance upon the bearing for the base as a means for maintaining electrical connection between the trolley and the lead wire.

Another object of the invention is to perfect details of construction of such swivel joint for trolley bases.

With the above and other objects in view the invention consists in the swivel air joint for trolley bases as herein claimed and all equivalents.

Referring to the accompanying drawings in which like characters of reference indicate the same parts in different views; Figure 1 is a central sectional view of a trolley base provided with a swivel air joint constructed in accordance with this invention. Fig. 2 is a detailed sectional view of the swivel air joint; Fig. 3 is a sectional plan view thereof on the plane of line 3—3 of Fig. 2. Fig. 4 is a perspective view of the tubular stem.

In these drawings 10 represents a stationary base ring which is adapted to be secured to the roof of a car and 11 is the rotary base mounted therein with a ball bearing 12 therebetween. The trolley pole 13 is pivotally mounted in the base frame 11 and is pulled upwardly by means of a coil spring 14 as usual. A plunger 15 fitting in a cylinder 16 carried by the base frame 11 has a connecting rod 17 connecting with the trolley pole and an automatic controlling valve 18 such as covered by my co-pending application Serial No. 767,016 filed May 12th, 1913, controls the admission of compressed air to the cylinder for forcing the piston outwardly and thereby throwing the trolley pole downwardly in the event of the trolley leaving the trolley wire. The air passageway 19 leading to the automatic valve 18 connects with a socket 20 at the center of the trolley frame 11 and a tubular stem 21 approximately square in cross section is threaded into the socket 20. At its lower end the stem 21 has an enlarged head 22 which is cylindrical and fits within a cylindrical casing 23 of a hose connection 24 having a compressed air supply hose 25 connected therewith. The head 22 of the tubular stem has radial openings 26 communicating with a surrounding groove 27, which registers with the opening through the hose connection 24, thereby maintaining communication between the hose connection and the bore of the tubular stem while permitting the tubular stem to turn within the casing 23. At the upper end of the casing 23 there is an inturned flange 28 fitting around the rounded portion 29 of the stem 21 which is the portion thereof nearest the head 22 and a V shaped flange 30 on the upper edge of the head 22 is held by the pressure of the compressed air tightly against a washer 31 of leather or other suitable material within the casing against the flange 28 thus serving to prevent the escape of compressed air. At its lower end the casing 23 is closed by means of a screw plug 32.

A contact disk 33 preferably of copper is fastened to the bottom of the central part of the trolley base frame 11 in any desirable manner and a lead wire connection 34 has a flat disk like end surrounding the stem 21 with its opening of sufficient size to permit the stem to turn therein and is held firmly against the contact disk 33 by means of a coil spring 35 engaging said plate around a depending boss 36, the other end of the spring bearing on a spring seat 37 which has a square opening to fit upon the square stem, and said seat being held by the spring pressure against the shoulder of the stem at the edge of the round portion 29 which is above the casing 23 so that the spring pressure is not brought to bear against the casing. The flange of the spring seat 37 is preferably made hexagonal in order that it may be used for turning the stem 21 into or out of its threaded engagement with the socket 20.

In use the trolley base may be turned as desired without affecting the air communication therewith, the stem 21 turning with the trolley base and retaining its uninterrupted communication with the hose connection 24 without a leakage of the compressed air. Furthermore such turning of the trolley base does not affect the electrical connection between the trolley and the lead wire, the lead wire connection being held firmly by the spring against the contact plate 33 while the latter turns with the trolley base and the electrical connection is independent of the swivel bearing of the trolley base so that the ball bearing does not have to carry the current and is therefore not affected by the current as is usually the case. The air pressure within the casing 23 serves to hold the head of the stem firmly against its sealing gasket 31 so that there is no leakage of pressure notwithstanding the fact that the trolley is so mounted as to freely turn.

What I claim as new and desire to secure by Letters Patent is:

1. A swivel base for trolleys retrieved by air pressure, comprising a rotatably mounted base frame carrying a trolley and an air pressure trolley retrieving means, a tubular stem secured to the center of the base frame and having communication with the air passageway of the trolley retrieving means provided with an enlarged head, a flanged cylindrical casing fitting upon the head of the stem and having a connection for the compressed air supply communicating with the bore of the stem, sealing means between the flange of the casing and the head of the stem and a spring pressed lead wire connection surrounding the stem and engaging the base frame, and means for closing the end of the casing.

2. A swivel base for trolleys retrieved by air pressure, comprising a rotatably mounted base frame carrying a trolley and an air pressure trolley retrieving means, a tubular stem secured to the center of the base frame and having communication with the air passageway of the trolley retrieving means and provided with a shoulder and an enlarged head, a flanged casing fitting around the head of the stem and having a compressed air supply connection communicating with the bore of the tubular stem, a sealing means between the flange of the casing and the head of the stem, means for closing the end of the casing, a spring seat surrounding the stem and engaging the shoulder thereof, a lead wire connection surrounding the stem, and a coil spring surrounding the stem and bearing against the spring seat and the lead wire connection respectively to hold the lead wire connection in contact with the base frame.

3. A swivel base for trolleys retrieved by air pressure, comprising a rotatably mounted base frame carrying a trolley and compressed air retrieving means therefor, a tubular stem threaded in the center of the base frame and having communication with a passageway of the retrieving means, a head on the end of the stem, a flanged cylindrical casing having the head of the stem fitting therein, a V shaped annular flange on the end of the head of the stem, a gasket within the casing between the flange thereof and the annular flange of the head of the stem, there being an annular groove around the head of the stem with a radial opening connecting said groove with the bore of the stem, a hose connection on the casing communicating with the annular groove, a screw plug threaded on the end of the casing, a portion of the stem being angular in cross section and terminating in a shoulder, a spring seat having a correspondingly angular opening fitting on said portion of the stem and against the shoulder, a lead wire connection surrounding the stem, a contact plate secured to the bottom of the base frame, and a coil spring surrounding the stem and engaging the spring seat and the lead wire connection respectively to hold the lead wire connection in contact with the contact plate.

In testimony whereof, I affix my signature, in presence of two witnesses.

FRANK A. WASSON.

Witnesses:
R. S. C. CALDWELL,
KATHERINE HOLT.

Copies of this patent may be obtained for five cents each, by addressing the "Commissioner of Patents, Washington, D. C."